United States Patent [19]

De Pous et al.

[11] Patent Number: 4,486,544

[45] Date of Patent: Dec. 4, 1984

[54] TITANIUM BORIDE BASED SINTERING COMPOSITION AND THE USE THEREOF IN THE MANUFACTURE OF SINTERED ARTICLES

[75] Inventors: Olivier De Pous, Chene-Bougeries, Switzerland; Dominique Richon, Gaillard, France; Hans Novotny, Ernstbrunn, Australia

[73] Assignee: Battelle Memorial Institute, Carouge, Switzerland

[21] Appl. No.: 412,293

[22] Filed: Aug. 27, 1982

[30] Foreign Application Priority Data

Aug. 31, 1981 [CH] Switzerland .......................... 5572/81

[51] Int. Cl.$^3$ ............................................. C04B 35/58
[52] U.S. Cl. .......................................... 501/96; 264/65; 264/66; 423/297

[58] Field of Search .......................... 501/96; 423/297; 264/65, 66

[56] References Cited

U.S. PATENT DOCUMENTS

| | | | |
|---|---|---|---|
| 2,678,870 | 5/1954 | Cooper | 423/297 |
| 3,928,244 | 12/1975 | Passmore | 501/96 |
| 4,007,251 | 2/1977 | Isaksson et al. | 501/96 |

*Primary Examiner*—Mark Bell
*Attorney, Agent, or Firm*—Karl F. Ross

[57] ABSTRACT

A powder composition suitable for the pressureless thermal sintering of articles which may be used in aluminium electro-thermics contains titanium boride with boron and titanium hydride as densifying additives. During sintering these additives form titanium boride. As this is identical to the substance of the sintered article the additives therefore do not constitute impurities in the sintered article.

11 Claims, No Drawings

TITANIUM BORIDE BASED SINTERING COMPOSITION AND THE USE THEREOF IN THE MANUFACTURE OF SINTERED ARTICLES

FIELD OF THE INVENTION

The present invention relates to a titanium boride ($TiB_2$)-based powder composition which is used to manufacture, by pressureless thermal sintering, high density sintered $TiB_2$ articles particularly suitable in the sphere of aluminum electrothermics. The invention also relates to the method of using the said composition in the manufacture of sintered $TiB_2$ articles, in particular electrodes for the electrolysis of cryolite or aluminum chloride, by thermal sintering.

BACKGROUND OF THE INVENTION

It is known that titanium boride is a very tough material which is resistant to oxidation and is a good electrical conductor; it may therefore be advantageously used as the material for electrodes in the sphere of aluminum production by electrolysis (Hall-Héroult methods and others). When it is pure and compact it resists thermal shocks and corrosion by molten aluminum and cryolite. In industry the parts to be used as electrolyzers are obtained from $TiB_2$ powder, either by hot sintering under pressure when the powder is very pure, or by normal sintering when the oxygen content ($TiO_2$ or $B_2O_3$) in the starting powder is high.

As the quality of the materials obtained in the second case is not sufficient for the intended use, since the presence of oxides in the sintered material causes a very marked reduction in its resistance to corrosion and thermal shock, only the pressure sintering method enables parts to be produced which meet the above-mentioned requirements. However, pure $TiB_2$ sintered parts, obtained by high pressure thermal sintering of titanium boride powder, are expensive and difficult to obtain owing to the technical problems connected with the simultaneous application of high temperatures and high pressures.

These difficulties have been overcome by using densifying additives during pressureless thermal sintering, which enable high density compact forms to be produced. Metal silicides of groups 4a to 6a of the periodic table (U.S. Pat. No. 4,017,426), nickel phosphide and a component selected from Cr, Mo, Nb, Ta, Re, Al and their borides (U.S. Pat. No. 4,246,027), tungsten, titanium and boron carbides (U.S. Pat. No. 4,108,670) and boron nitride (U.S. Pat. No. 4,097,567) may be cited as additives of this type. However, the sintering of $TiB_2$ powders containing such additives produces forms in which these additives remain included, which is undesirable for the following reasons: contamination of the molten aluminium and pollution of the latter by these impurities, undesirable slow restructuring of the electrode material, low resistance to thermal shocks. During the course of the electrolysis of aluminium ores the presence of impurities in the $TiB_2$ leads to the formation of a large-grained structure which is more fragile, less resistant to corrosion and to the precipitation of $Ti_2AlN$ and $Ti_2AlC$ type phases, by the slow migration of the impurities when carbides or nitrides are used as additives.

SUMMARY OF THE INVENTION

The present invention completely overcomes these disadvantages.

The composition according to the invention comprises boron and titanium hydride as densifying agents in relative proportions such that during thermal sintering the reaction $TiH_2 + 2B \rightarrow TiB_2$ occurs. Thus, during compacting and thermal sintering the titanium hydride and the boron act as densifiers and, after separation of the hydrogen following decomposition of the hydride, the titanium combines with the boron to produce $TiB_2$ which is chemically identical to the substance subjected to sintering and therefore does not constitute an impurity remaining in the latter after heating. Furthermore, the $TiH_2$ decomposition provides a very fine titanium powder which is favorable to densification during sintering. Normally, comparably fine titanium powders commercially available contain a proportion of oxides (which is undesirable in the present case as was seen above) and consequently the $TiH_2$ of the compound according to the invention is, in fact, a precursor of the formation of a fine-grained powder of this type, the hydrogen produced by the decomposition also being able to act as a reducing agent for the oxides which may possibly be present in the compound.

Thus the invention enables sintering without pressure by adding densifying additives which, combining with each other to form $TiB_2$, do not remain in the end product in the form of dissolved impurities or inclusions.

This use of the composition therefore provides results which are practically the same as those obtained with hot pressure sintering of $TiB_2$ powder without additives. It also enables complex forms for electrothermic uses to be manufactured in easily produced conditions, these forms being obtained with a degree of precision and quality of finishing equivalent to those resulting from the use of known densifying agents. The powder to be sintered according to the invention therefore constitutes a considerable technical advance with respect to the powders known hitherto. The proportions by weight of the $TiH_2 + B$ mixture with respect to the total of the present composition are selected such that the proportion of $TiB_2$ thus incorporated in the sintered article produced by sintering of the composition is of the order of 2 to 10% by weight, preferably 3 to 7%. Below 2% the effect sought after is insufficient and quantities above 10% do not provide significant improvements.

In order to use the composition according to the invention it is molded in a technically suitable manner (for example applying isostatic or controlled pressure) then it is subjected to thermal sintering. Consequently, the method according to the invention for the use of the present composition in the manufacture of sintered $TiB_2$ articles is defined as follows:

(a) the powder to be sintered is placed in a mold (or matrix) having the shape of the desired article;

(b) this mold (or matrix) is subjected to isostatic (or uniaxial) pressure of 1 to 6 $T/cm^2$ then the "green" article thus moulded is removed from the mold;

(c) the article thus compacted is heated under vacuum in order to degas it and to induce decomposition of the titanium hydride into titanium plus hydrogen;

(d) the article is heated for 30 to 120 minutes between 1800° and 2200° C. under vacuum or under an inert gas, this latter operation inducing the desired sintering and densification.

This method is extremely advantageous since, taking into account the contraction during densification (of the order of 40 to 60% by volume) the object may be shaped to the approximate dimensions desired which enables subsequent machining to be minimized. Moreover, it is possible to correct the part before sintering (green machining) or after presintering at approximately 1400° C. Preferably a binder is added to the powder to be sintered before stage (a) of the present method of use. The aim of this binder is to "stick" the particles of powder to one another momentarily, cold, during molding and to improve the mechanical resistance of the "green" molded product when it is handled. Of course, the binder is selected in such a way that it decomposes (or evaporates) completely during stage (c) of the process and that no trace thereof remains after sintering. A wax or some other organic binder usually used for this purpose may be used as a binder. Camphor is highly suitable.

Preferably, the preliminary stages (a) and (b) are performed according to the known usual means of ceramics technology.

Thus the powder composition is molded with or without a binder in a mold having the shape of the desired object. Then, according to stage (b), the molded object is subjected to isostatic pressure at approximately 1 to 6 T/cm$^2$ for several seconds, in a dry or wet mold. After pressing and removing from the mold, the preformed article ("green") is obtained with is formed by the agglomerated powder, the "green" density of which is of the order of 1.4 to 1.8 g/cm$^3$, this value depending on the grain size of the TiB$_2$ used for the formulation of the starting composition. In this respect it is advantageous to use a very finely grained powder, the specific surface area of which is of the order of 1.0–1.5 m$^2$/g (particles of the order of a micron).

With respect to stages (c) and (d), it is possible to proceed as follows: The "green" preform is placed in a tantalum crucible which is placed in a furnace (the form of the crucible is preferably such that the article is protected against direct heat radiation. Subsequently, in order to perform degasification, i.e. successively, the evaporation of the organic binder and the separation of the hydrogen from the TiH$_2$, heating is performed progressively for 2-3 hours up to approximately 800° to 1000° C., under a vacuum of 10$^{-3}$-10$^{-4}$ Torr. Subsequently the temperature is increased more rapidly (800° C./hour) (under a vacuum of 10$^{-4}$-10$^{-5}$ Torr or argon at normal pressure) until the sintering point is reached, this temperature is maintained for the time desired and, finally, the assembly is allowed to cool. The heating time and sintering temperature are connected in the sense that the shorter the period of time, the higher the temperature. Preferably, heating is performed from 30 minutes to 3 hours at approximately 2000° C.; these conditions are only given here as an indication showing the economic advantage of the present method. After sintering, if desired, it is possible to reheat the part at a temperature (for example of the order ot 1600° C.) in order to modify the microstructure and to improve the mechanical qualities thereof.

For the preparation of the powder mixture constituting the composition according to the invention commercial products are readily usable, provided that their grain size is suitable and their purity sufficient. If the powders used are too coarse they may be refined beforehand in suitable grinders or mills, likewise according to the known means and preferably in an inert atmosphere. Or it is also possible to mix such products and grind this mixture in such a way that after grinding the particles of the constituents acquire suitable grain size within the above range. A TiB$_2$ ball mill may be used as a grinder if a sintered form with the minimum of impurities is desired or with tungsten carbide or metal balls if the presence of a slight amount of WC is not harmful.

In order to obtain efficient grinding and dispersion of the constituents of the powder of the present compound it is advantageous to perform this operation in a liquid which provides the mixture with a pasty consistency and which, moreover, has the advantage that it protects the TiB$_2$ from oxidation. The liquid can be an organic liquid, the nature of which is not crucial, hydrocarbons and alcohols are suitable as liquids and, preferably, hexane or a mixture of petroleum ether and tert. butanol is used. After grinding, the powder is carefully dried in an inert atmosphere (argon or other), or under vacuum.

It is noted that at the stage of grinding the powder of the composition according to the invention it is possible to incorporate therein possible additives, for example the abovementioned organic binder. It is possible to use an organic compound or a mixture of organic compounds both as a grinding vehicle and as a binder.

The composition according to the invention, and its method of use for manufacturing parts by sintering, lead to products whose physical and chemical properties are equivalent to those of similar products obtained by hot pressing. Thus the densities obtained after sintering may easily reach 4.5 to 4.6 g/cm$^3$ which corresponds to the calculated theoretical density. It should, however, be noted that the high values of the densities measured may partly be due to the inclusion of slight quantities of WC (which originate from the initial grinding of the starting powder in a tungsten carbide ball mill). If desired, the compactness of the sintered product may also be determined by metallographic analysis rather than by measuring the density.

SPECIFIC EXAMPLES

The following examples illustrate the invention in greater detail.

EXAMPLE I

In a tungsten carbide ball mill with a capacity of 500 ml containing 100 ml hexane, 95 g of TiB$_2$ CERAC powder, T-II-50, grain size (325 mesh), were mixed and ground for 24 hours in an inert atmosphere (Ar or N$_2$) with 3.57 TiH$_2$ (origin: MERCK Res 12384) and 1.57 g crystalline boron powder (origin: CERAC 1012 S), these proportions being provided in order that, after separation of the hydrogen during sintering, the proportion of densifying agent in the sintered object was 5% by weight. The mill turned at approximately 140 rpm during grinding. Then the powder was collected in the inert atmosphere and was dried under vacuum. After this operation its specific surface area was 1.2 m$^2$/g, this value being measured by the BET method. This powder was subsequently treated, still with the exclusion of air, with 40 ml of a 5% solution of camphor in ether which corresponds to the incorporation in the powder of 2% by weight camphor, after the evaporation of the ether by homogeneous agitation.

Still under the protection of a blanket of inert gas, the camphor powder mixture was placed in a rapid hardening silicone resin mold and was pressed (20 seconds under 3 t/cm² in the form of an electrode part (bar). The removing from the mold of the "green" preform obtained in this manner and the storage thereof are performed in an inert atmosphere, still in order to avoid surface oxidation.

The "green" preform was then placed in a closed tantalum crucible and this was placed in the chamber of a tungsten resistance electric furnace. The chamber was evacutated to approximately 5 to $10^{-6}$ Torr and the crucible was slowly heated to approximately 800° C. (approximately 3 hours) in order to bring about the elimination of the camphor and hydrogen from the TiH$_2$ while maintaining the pressure lower than $10^{-4}$ Torr. Heating was then performed to a temperature of 2000° C., still at $10^{-4}$ (approximately 1 hour) and then it was allowed to cool. A sintered part (B) was thus obtained, the properties of which were measured and these are shown in Table 1 below. In addition, the above operations were repeated using a TiB$_2$ powder without a densifying additive as a first control sample (A) (thus not forming part of the invention) and a composition according to the invention with 10% additives was used as a second sample (C). Samples A', B' and C' were likewise prepared with the same starting materials and in the same conditions with the exception of the sintering time which was two hours. The densities obtained are shown in Table 1.

TABLE I

| Sample | Additive (% by weight) | Sintering time (Hours) | Density (g/cm³) |
|---|---|---|---|
| A | 0 | 1 | 4.41 |
| B | 5 | 1 | 4.49 |
| C | 10 | 1 | 4.50 |
| A' | 0 | 2 | 4.33 |
| B' | 5 | 2 | 4.57 |
| C' | 10 | 2 | 4.44 |

It may be seen from the above results that the highest densities correspond to the use of an additive proportion in the region of 5% and a sintering time of two hours (sample B').

The preceding series of tests was repeated in conditions identical to those given in Table I with the exception of the sintering temperature which was increased to 2100° C. (samples D,E, F and D', E' and F'). A number of samples (D", E" and F") was likewise prepared for which the sintering time (at 2100° C.) was only ½ hour. The results of these tests are shown in Table II below.

TABLE II

| Sample | Additive (% by weight) | Sintering time (hours) | Density (g/cm³) |
|---|---|---|---|
| D" | 0 | ½ | 4.50 |
| E" | 5 | ½ | 4.56 |
| F" | 10 | ½ | 4.46 |
| D | 0 | 1 | 4.57 |
| E | 5 | 1 | 4.61 |
| F | 10 | 1 | 4.50 |
| D' | 0 | 2 | 4.38 |
| E' | 5 | 2 | 4.62 |
| F' | 10 | 2 | 4.51 |

As previously, the highest densities were obtained when the additive content was in the region of 5%. In addition, at 2100° C. the duration of sintering may be shortened (obtaining high densities after heating of the order of only ½ hour). In contrast, the increase in density arising simply from an increase in heating time of 1 to 2 hours does not appear to be significant.

EXAMPLE II

A sample identical to sample (B) of the preceding example was prepared (compound with 5% additives) but sintering was carried out under argon (instead of a vacuum), the operations being performed in the following conditions:

The pressed compact form was placed on a graphite plate in the center of heating elements also made of graphite, the entire assembly being in the chamber of a sintering furnace.

The assembly was degassed under a primary vacuum (at 300° C.; $10^{-3}$ Torr).

Subsequently the chamber was filled with argon (99.5%) at ordinary pressure and the temperature was increased to 2000° C. at a rate of 1000° C./hour; this temperature was then maintained for two hours then the heat was cut off. After cooling, the density of the sintered object was measured and a value of 4.12 g/cm³ was found. The results of sintering in an inert atmosphere are therefore slightly inferior to those obtained under vacuum.

EXAMPLE III

A number of samples was prepared according to the method of example I with compounds having 5% additives and sintering times of ½ hour (G), 1 hour (B) and 2 hours (B') at 2000° C. Corresponding samples (Ga, Ba and B'a) were likewise prepared for which the boron used was amorphous (origin: FLUKA no 15570) instead of being crystalline. The results are shown in Table III.

TABLE III

| Sample | State of boron | Sintering time (hours) | Density (g/cm³) |
|---|---|---|---|
| G | cryst. | ½ | 4.32 |
| Ga | amorphous | ½ | 4.51 |
| B | cryst. | 1 | 4.49 |
| Ba | amorphous | 1 | 4.58 |
| B' | cryst. | 2 | 4.57 |
| B'a | amorphous | 2 | 4.54 |

These results show that at 2000° C. and for short sintering times the amorphous boron provides densities which are higher than those given by crystalline boron.

The above tests were repeated but increasing the sintering temperature to 2100° C. The results are shown in Table IV.

TABLE IV

| Sample | State of boron | Sintering time (hours) | Density (g/cm³) |
|---|---|---|---|
| E" | cryst. | ½ | 4.56 |
| E"a | amorphous | ½ | 4.42 |
| E | cryst. | 1 | 4.61 |
| Ea | amorphous | 1 | 4.41 |
| E' | cryst. | 2 | 4.62 |
| E'a | amorphous | 2 | 4.33 |

These results show that at 2100° C. and for increased sintering times crystalline boron produces higher densities than amorphous boron.

We claim:

1. A powder composition for pressureless sintering, consisting essentially of titanium boride and, as densifying additives, boron and titanium hydride in molar ratio 2:1, wherein said composition contains 2 to 10% of the densifying additives by weight.

2. A powder composition for pressureless sintering as claimed in claim 1 containing 3 to 7% of the densifying additives by weight.

3. A powder composition for pressureless sintering as claimed in claim 1 containing 5% of the said additives by weight.

4. A powder composition for pressureless sintering as claimed in claim 1, 2 or 3 in which the titanium boride powder has a specific surface area greater than 1 in$^2$/gm.

5. A method of making a sintered article of TiB$_2$, which method comprises:
  (a) providing a powder mixture consisting essentially of titanium boride and, as densifying additives, boron and titanium hydride in molar ratio 2:1, wherein the powder mixture contains 2 to 10% of the densifying additives by weight,
  (b) molding the said powder mixture under a pressure of 1 to 6 ton/cm$^2$ to form a green article,
  (c) heating the green article under a vacuum, thereby degassing it and decomposing the titanium and hydrogen, and
  (d) heating the article in a vacuum or an inert atmosphere for 30–120 minutes at a temperature of 1800° C.–2200° C., thereby sintering and densifying the article.

6. A method as claimed in claim 4 in which step (c) comprises progressively heating the green article to 800° C. under a pressure not exceeding $10^{-4}$ Torr.

7. A method as claimed in claim 4 in which step (d) is performed in an argon atmosphere.

8. A method as claimed in claim 4 in which the powder mixture, before being molded, is mixed with an organic binder, and the binder is evaporated in step (c).

9. A green preform comprising a powder mixture consisting essentially of titanium boride with 2 to 10% of densifying additives in the form of boron and titanium hydride in a molar ratio of 2:1 and compressed at a pressure of 1 to 6 tons per cm$^2$.

10. A method as claimed in claim 4 wherein the powder mixture contains 3 to 7% of the densifying additives by weight.

11. A method as claimed in claim 2 wherein the powder mixture contains 5% of the densifying additives by weight.

* * * * *